(12) United States Patent
De Almeida Neves et al.

(10) Patent No.: US 9,224,026 B2
(45) Date of Patent: Dec. 29, 2015

(54) AUTOMATIC SYSTEM AND METHOD FOR TRACKING AND DECODING BARCODE BY PORTABLE DEVICES

(75) Inventors: Gustavo De Almeida Neves, Salvador-Bahia (BR); Eduardo Telmo Fonseca Santos, Salvador-Bahia (BR); Eduardo Manuel De Freitas Jorge, Salvador-Bahia (BR); Alberto Almeida De Azevedo Filho, Lauro de Freitas-Bahia (BR)

(73) Assignee: SAMSUNG ELECTRÔNICA DA AMAZÔNIA LTDA., Campinas-São Paulo (BR)

( * ) Notice: Subject to any disclaimer, the term of this patent is extended or adjusted under 35 U.S.C. 154(b) by 28 days.

(21) Appl. No.: 12/981,616

(22) Filed: Dec. 30, 2010

(65) Prior Publication Data
US 2012/0173347 A1 Jul. 5, 2012

(51) Int. Cl.
*G06Q 20/00* (2012.01)
*G06K 7/10* (2006.01)

(52) U.S. Cl.
CPC ........ *G06K 7/10861* (2013.01); *G06K 7/10722* (2013.01)

(58) Field of Classification Search
None
See application file for complete search history.

(56) References Cited

U.S. PATENT DOCUMENTS

| | | | |
|---|---|---|---|
| 8,229,781 B2* | 7/2012 | Zenor et al. | 705/7.31 |
| 2004/0099741 A1* | 5/2004 | Dorai et al. | 235/462.08 |
| 2004/0206821 A1* | 10/2004 | Longacre et al. | 235/462.07 |
| 2005/0011957 A1* | 1/2005 | Attia et al. | 235/462.46 |
| 2005/0203854 A1* | 9/2005 | Das et al. | 705/64 |
| 2005/0225648 A1* | 10/2005 | Lin et al. | 348/222.1 |
| 2006/0202039 A1* | 9/2006 | Wang et al. | 235/462.27 |
| 2007/0257934 A1* | 11/2007 | Doermann et al. | 345/606 |
| 2007/0267501 A1* | 11/2007 | Jovanovski et al. | 235/472.01 |
| 2008/0105747 A1* | 5/2008 | Orlassino | 235/462.41 |
| 2009/0001165 A1* | 1/2009 | Zhang et al. | 235/462.11 |
| 2009/0212113 A1* | 8/2009 | Chiu et al. | 235/462.41 |
| 2009/0308927 A1* | 12/2009 | Longacre et al. | 235/462.1 |
| 2012/0029994 A1* | 2/2012 | Barkan et al. | 705/14.25 |

FOREIGN PATENT DOCUMENTS

BR   PI 0603273-7   1/2008

OTHER PUBLICATIONS 6 pages—entitled "Digital Processing of Barcode Image using Mobile Phones" by James Tudisco Henrique dos Santos and Almir Olivette Artero, published on Jul. 7, 2010.
5 pages—entitled "Locating and Decoding EAN-13 Barcodes from Images Captured by Digital Cameras" by Douglas Chai and Florian Hock, dated Dec. 6, 2005.

* cited by examiner

*Primary Examiner* — Fateh M Obaid

(57) ABSTRACT

A system and method for automatic tracking and decoding barcode image on the standard EAN-13 through portable, or mobile, devices makes it possible to track the barcode in any position and orientation it is in and decode it automatically in real time. To make the tracking and decoding of barcodes, methods are applied on the captured image, seeking the guidance and location of the barcode.

18 Claims, 12 Drawing Sheets

AUTOMATIC SYSTEM AND METHOD FOR TRACKING AND DECODING BARCODE BY PORTABLE DEVICES

FIELD OF THE INVENTION

The present invention relates to the field of human interaction with mobile devices, in particular the interaction done by means of the automatic recognition of barcode images captured through the camera integrated in portable devices, particularly mobile phones, smartphones, personal digital assistants—PDA, portable digital camera, among others.

The present patent application refers to a system and method for automatic tracking and decoding of barcode image on the standard EAN-13 through portable devices.

Through this system you can track the barcode in any position and orientation it is and decode it automatically in real time. To make the tracking and decoding of the barcode, methods are applied on the captured image, seeking the guidance and location of the barcode.

BACKGROUND OF THE INVENTION

Currently, the barcode technology is part of various sectors of the commercial, industrial and financial area. We can find barcodes to identify the products of a supermarket, books of a library, in the machinery of an industry, in bank bills, in the equipment of an organization, employee's badges in a company, etc.

In general, the barcodes representing the original information through the widths and spaces of parallel bars arranged horizontally. This type of barcode has only one dimension and is known as one-dimensional barcode or linear. As an example of linear barcode has the EAN-13, the code 128, the code 39, among others.

Recently, there have been barcodes capable of storing information vertically and horizontally and are called 2D or two-dimensional barcode. They can store a large amount of information. As an example we can cite the QR Code, Data-Matrix, PDF417, the Code 49, among others.

Some barcodes have their structure standardized by international organizations, such as the EAN-13. Other codes are free, where those who want to use it can freely position the data as desired, for example, the code 128. With this, many organizations have defined their own structures.

The standard barcode EAN-13 is often used to identify products sold in shops. This standard barcode consists of a unique identification of products that is used by manufacturers, wholesalers, retailers, distributors and consumers in nearly all the world.

To read the barcode, it uses an optical scanning equipment known as a scanner or barcode reader. This equipment performs the scanning of the barcode by sending a beam of red light that is absorbed by the dark bars and reflected by the white bars. Sensors present in the scanner captures this information and send it to a computer that performs data translation for numbers or letters.

With the advancement of technology, it became possible to create lighter barcode readers based on optical reading and that occupy less space, making them more portable. Despite this, these readers are designed only for reading barcodes, and, in general, can only make the reading of the standard barcode for which they were developed.

The U.S. patent US2006020039, entitled: Camera-based Barcode Recognition, published on Sep. 14, 2006, proposes a system for decoding barcodes from images captured by digital cameras. This system performs the decoding of barcodes from images obtained in preview mode, but does not present a technique to prevent degradation of the images displayed on the display of the device in question. To find the limits of the barcode, the patent US2006020039 uses a method that has as its principle finding the white areas located on the left and right side of the barcode from the center of the same. This method is inefficient because these white areas can be found damaged, making this method inaccurate. After correcting the rotation, the image returned will be a sub-region located in the center of the barcode, excluding the rest of the code. This procedure is not efficient, because the image may be returned in worse condition than in the excluded regions. The binarization used by said patent has fixed parameters, i.e., they are not adaptive, thus, this process becomes ineffective, reducing the probability of success of the decoder.

The patent US20050011957, entitled System and Method for Analyzing and Decoding Barcodes Using a Mobile Device, published on Jan. 20, 2005, presents an application for decoding barcodes. This application consists of a system and method that improves the image and get the information encoded by the barcode contained in the image. Then, through a wireless connection, it sends the result of decoding to a server that is responsible for processing the barcode information and transmit back the content associated with the mobile device. That patent describes, without giving details, the complete flow of a process for image correction and decoding of the barcode. This process takes several attempts to decode using different parameters, which are obtained through a pre-established set of parameters, which aims to improve the image and thereby increasing the probability of decoding the barcode successfully. These operations are performed on images captured in the "preview" mode of the camera integrated into the mobile device. That patent mentions methods for: rotation correction, perspective correction, removal of shear, correction of problems related to lighting, focus adjustment, among other for removing the distortions that can affect the image of the barcode. The patent US20050011957 does not describe the operation of an important requirement for successful decoding, the calculation of the cutting level between white and black.

The patent document PI 0603273-7, published on Jan. 25, 2008, describes a system and method that uses software to perform the decoding of barcodes on mobile devices. That patent describes a method of pre-processing the image captured by the camera of the device to verify the presence of a barcode. This method consists of converting the image into two colors, and then performing a scanning process of the image that aims to convert the same into two color states. After this procedure, the elements contained in the image are filtered. Next, a parameterization is performed to identify the component parts of the image. Then, the component parts are checked to locate or not a barcode. If the scan result is positive, the value represented in the barcode is obtained. The steps taken by the process described in document PI 0603273-7 Brazil are not presented in sufficient details. The document PI0603273-7 shows the current state of the art, and does not adds new elements or explain how to solve the problems, while showing them.

The document entitled "Digital Processing of Barcode Image using Mobile Phones" by James Tudisco Henrique dos Santos and Almir Olivette Artero, published on Jul. 7, 2010 at the Sixth Workshop on Computer Vision, proposes the use of mobile phones equipped with cameras to read and interpret barcode EAN-13, using J2ME technology. This document uses the Sobel operator for edge detection to locate and make reading the barcode. The method presented in this article creates a map of directions from the edges of the gradients obtained by running the Sobel operator, eliminating the edges with low magnitude. The said system does not include solutions for problems related to lighting, so in order to have the decoding done successfully, it is necessary that the barcode is in ideal conditions, with no anomalies caused by a lack of focus, shadows and noise.

The document entitled "Locating and Decoding EAN-13 Barcodes from Images Captured by Digital Cameras" by Douglas Chai and Florian Hock, dated Dec. 6, 2005, presents a technique based on computer vision to locate and decode barcode. To locate the barcode, the image is divided into blocks of 32×32 pixels, and then applies the method of Otsu-thresholding for thresholding in each of these blocks. Then, it is carried out a morphological operation called "skeletonizing" in each block. To determine whether the block has a barcode or not, they separate the connected components of each block, and then calculates the angle of these components relative to the axis x. Only those blocks whose angles of the components are similar, indicating that they are parallel, are kept in the picture. Although the technique seems to be effective, it requires a high computational cost, since the method presented in this article performs morphological operations that require high computational costs. The paper presents a simple method of decoding, which runs without any previous treatment in the image to remove distortions caused by the lighting of the environment, treatment of signal/noise, perspective removal.

The papers cited above have various processes for decoding barcode, where each has different methods to try to recognize the barcode in the best possible way. Images captured in uncontrolled environments suffer interference that impedes their analysis. These interferences can be: problems related to lighting, presence of image noise, low contrast, image captured in motion, blur, perspective and rotation distortion, among other problems. Most solutions described by the mentioned papers will perform reading the barcode successfully, only if the image is captured under ideal conditions, that is, if there is no influence of the problems previously reported. Many studies have cited the need to implement methods to improve image quality, and therefore increasing the probability of successful decoding, however, they do not describe in details how of these methods works.

The patent document U.S. US20040099741, published on May 27, 2004, disclosures a system and method for obtaining information about the selected image from a digital image and provides information about the image selected for handling. In one aspect, the present invention locates and automatically segment an item from an image captured by a digital camera and provides an image information on the item for processing. Alternatively, a user can designate which areas of an image include the item of interest for viewing or further processing, the slope being located based on the Hough transform.

The patent document U.S. US20060202039, published on Sep. 14, 2006, presents a system for decoding information concerning barcodes from an image captured by the camera, by generating a binary sequence of the captured image and decoding information coming from the barcode sequence binarized. The image captured by the camera is pre-processed in a grayscale image, and enhancing the contrast between the bars and spaces of the pre-processed image. The orientation of the barcode is identified so that it is parallel to the bars in the pre-processed image. A designed sequence is formed by projecting pixels of the preprocessed image along the orientation of the barcode. The binarized sequence is formed by applying a threshold to detect peaks of the designed sequence. A sequence of barcode is formed, starting from the binarized sequence, in which each bar and each barcode space are represented by a single bit in their coding sequence of the barcode. Then, information is extracted from the sequence of the encoded barcode. According to the teachings of that document, the tilt angle is found by projecting the binarized image of the barcode on the axes x and y.

Differently from the papers mentioned above, the present invention aims a method for reading the barcode from an image captured by a camera of a portable device, taking into account the presence of abnormalities that affect image quality. For this, the present invention provides a method to eliminate distortions related to perspective and the rotation of the barcode, lighting, low contrast, to improve the signal /noise rate, among others.

SUMMARY OF THE INVENTION

The present invention provides a system for decoding barcodes, embodied through an integrated hardware and software that tracks and decodes barcodes in real time by means of portable devices that have digital cameras. The system is able to track and decode the barcode in the standard EAN-13.

This invention aims to provide an efficient and effective method that allows consumers to check prices anywhere they are. The present invention allows the consumer through a portable device, equipped with a digital camera to quickly decode the barcode.

Aiming a level similar to that of decoding equipment of barcode readers with laser, the system of the present invention uses a method that allows the identification and decoding barcodes positioned in any region of the captured image. The system also allows the identification and decoding of barcodes that are rotated or have perspective.

The system of the present invention allows the user to select the desired location of the barcode. This mode can be automatic or manual. In automatic mode, the user fits the barcode on any display position of the camera and this, in turn, will be located and decoded. For the manual mode, the user must place the barcode within the boundaries of a targeted pre-positioned.

Problems Solved by the System of the Present Invention

Despite technological advances, mobile devices still have relatively limited hardware resources to run algorithms that perform advanced calculations. Therefore, the present invention using techniques of development aiming to reduce the computational cost, allowing a reduction in decode time and minimizing the use of the portable device processor, besides saving memory, optimizing, thus, the use of resources. These techniques also provide an increase in the strength of the barcode reader, as it was possible to increase the number of frames analyzed for the same time.

To perform the analysis in real time, it is necessary to use the frame captured by the camera's preview of the portable device and process it. However, depending on processing time, the presentation of the frames could be damaged because the frame can only be displayed on the display of the portable device after the processing, thus reducing the effective display rate of frames captured by the camera. This type of limitation in the visualization does not usually please the users, causing discomfort in using the equipment. To avoid this limitation, techniques of concurrent programming and communication between processes are used, enabling the development of an effective method that allows a frame to be processed, while the camera is still filming, causing the frames to continue to be captured and displayed on the display of the portable device. Therefore, it was possible to optimize the visualization in real time, allowing to process a given frame while continuing to capture and presenting the frames, maintaining the exhibition rate of the preview mode.

At the moment of the reading, the barcode may have been tilted and, with this, the decoding could be affected. To read the barcode directly, it is necessary that in the processed image, the bars have an inclination of approximately 90 degrees. Therefore, a specific method was developed that estimates the orientation of the barcode and then corrects the level of inclination, making it possible to decode barcodes inclined, and in turn, increasing the effectiveness of barcode reader. The tilt angle where a scan line across the barcode has the smallest variance in the shades of gray is used to estimate the slope of the barcode.

For cases in which the captured image of the barcode is not in proper conditions, it could result in loss of part of its information. This type of problem can be caused by environment lighting conditions, which can cause blur of light, excessive shade, poor clarity, among others. There are also very common situations in which the barcode is already damaged due to several factors, among which are: poor print quality, surface aging, damaged container or packaging, among others. In order to improve the effectiveness of the present invention, methods were created to perform the above correction of possible damages.

In order to improve the effectiveness of the present invention for reading barcodes, even under unfavorable conditions, a set of methods are applied to the image. First, it seeks only the region where the barcode is by eliminating components that compromise the result of the barcode reading. The barcode is divided into horizontal slices and each one of these slices is processed separately. For obtaining the values of the bars, vertical sub-regions are defined and, in turn, the threshold of black and white is calculated for each sub-region. A set of weights that adjust the threshold to level of lighting in the image are applied to the threshold. With this, the effects caused by poor image quality and/or external factors are eliminated, allowing the barcode reading.

The packaging of the products have different formats. For example, images of the labels with curved surface distort the size of the bars, making it hard to decode the barcode. To solve this problem, the present invention utilizes efficient algorithms to estimate the size of the bars.

In some cases, some cameras may be unable to fit neatly small objects, such as font type, where, as the camera moves closer, they remain blurry and unreadable. Some packages have, barcode so small that when the camera is far away, it is not possible to distinguish their bar due to insufficient amount of pixels, and when the camera is too close, the object may be blurred, even in cases where self-focus used. This problem is bypassed for cameras having focus macro support. This type of auto focus can focus on small objects by increasing their clarity and, in turn, allowing the barcode reading.

Technical Advantages/Functional of the Invention

Low computational cost: Seeking to improve the process of reading the barcode, programming techniques were used to optimize the performance of computer instructions, for example, using fixed point instead of floating point, using bit handling to perform some operations, using the minimum possible instructions to scan or copy the pixels of an image, among others.

Reading barcode efficiently and effectively: The reading is effective because it minimizes the use of computing resources, and is effective because it succeeds in most attempts to read, and can perform the decoding of barcode with different sizes, any position, any angle, and high perspective in environments with different lighting.

Real time processing: It is not necessary to capture a photo so that the decoding is performed. The system performs the entire procedure in real time, analyzing the frames obtained in preview mode. Therefore, it was possible to increase the robustness of the algorithm, since at every time a new frame is processed until the reading is successful. In addition, depending on the resolution supported in preview mode by the camera of the portable device, it is possible to further increase the effectiveness of barcode reader.

Use of concurrent programming: concurrent robust and agile computing techniques were used and communication between processes, causing the system to display the frames filmed by the camera of the portable device, while it is done the reading and decoding of the barcode present in any captured frame. Using this technique, you can perform the whole process of reading the barcode without affecting the exhibition rate of the camera's preview mode.

Identifying and correcting the orientation of the barcode: Seeking to further increase the effectiveness of the code reader of the present invention, it was developed a robust method to estimate the angle of the barcode. This method tries to find the direction of the bars of the barcode. For this, the image is divided into sub-regions, and in each of these portions a search is done for the scanning line having the smaller variance in a range of angles of 180 degrees.

Localization of the barcode: This process seeks to position the barcode on the image, returning the coordinates for the left side, top, right side and bottom of the barcode. With this, the barcode reader will need to analyze only the region within the limits of these coordinates, increasing in turn the efficiency of the algorithm, which will not have to process the whole image.

Elimination of useless regions: regions outside the limits found are excluded from reading, avoiding the processing of regions that do not belong to the barcode. With this, it has been improved the efficiency of the reader, since fewer parts of the image are analyzed, thereby reducing the processing time. The effectiveness is increased because elements that negatively influence the definition of the limits of cut in the barcode are eliminated, making only the bars, which are the relevant information, remain in the process, and, thus, increasing the probability of accuracy in decoding.

Identification of the barcode: In order to make the decoder not to be implemented in images that do not have a barcode, or having, but with blurry image, it is effected a previous analysis within the limits of the bar code. At this time, it will be checked the level of contrast, where, for cases in which this contrast is very low, the image is immediately ignored, so that the reader does not attempt to perform a decoding that could be unsuccessful, and with it, avoiding the waste of time computing something that would hardly be decoded. This increases the efficiency in the sense that, after ignoring the image, the process is restarted and thus a new frame that can have a better quality and more chances of decoding is provided.

Horizontal slicing of the barcode: barcode is sliced horizontally and the reading is performed in each of these slices individually. With this, we obtained a better efficiency, since the number of samples was increased, which led to an increase in the percentage of accuracy. If it does not succeed in decoding a slice, another one will be selected until the code is decoded or until all slices have been selected. The number of slices is set as the execution of reading, so that in the process it is obtained several slices of different sizes and positions, thus increasing the probability of successfully decoding.

Adaptive binarization method: this is the phase in which occurs the definition of barcode. At this stage, it is necessary to determine a cutoff threshold to separate the white level of the black level in the image of the barcode in shades of gray. To this purpose, methods were created to calculate the threshold in a flexible and adjustable way. This threshold adjusts to environment lighting. This is because the slice to be decoded is divided into vertical regions, and for each of these sub-regions we obtain a threshold as the intensity of its pixels. Furthermore, to this threshold are assigned weights that adjust the threshold to the environment lighting.

Reading barcodes on non-planar surfaces: The packaging of the products have different formats. It can be found packaging for products with rounded surfaces, oval, or even packages that are flexible plastic bags which surface has a specific shape. To increase the robustness of the process, it was created an adaptive method that allows the decoding of barcodes on surfaces with different formats. The method was created starting from the principle that all bars are derived from the thin bar, that is, to set the other bars, it is necessary to know the size of the thin bar. Knowing that depending on the surface that the bar is, the values can increase or decrease depending on the perspective caused by the shape of the package. Because of this, it is computed an estimated size of a thin bar for each digit of the barcode, because it is estimated the size of thin bar that is in the same perspective of the other bars that form the digit.

Reading barcodes with a perspective: to increase the effectiveness of reader, techniques were developed to allow the decoding of barcodes in perspective. This was possible due to the horizontal slicing that selects slices of the code that are in the same perspective, benefiting the decoding of barcodes with high perspective.

Validation of the result: in order to show only correct values, the present invention features methods of validation that checks the guard bars of the code and checking digit. Soon after setting the bar, it is checked if the guard bars are correct. After all digits have been decoded, it is checked the checking digit. If the check is correct, the decoded value is returned and the result is displayed.

Use hardware device with high mobility: the present invention can be performed on a small and lightweight portable device that can be carried to different places without taking up much space. With this, we obtained a portable and lightweight device that reads the barcode in real time.

BRIEF DESCRIPTION OF THE FIGURES

The objectives and advantages of the present invention will become more apparent from the following detailed description of an exemplary embodiment of the invention and attached drawings by way of non-limiting example, in which.

DESCRIPTION OF PREFERRED
EMBODIMENTS OF THE INVENTION

The system comprising the methods developed for this invention locates and decodes barcodes in real time from a portable device equipped with a digital camera. Thus, according to the preferred embodiment of the invention is provided a method to find and decode barcodes, running in real time from an integrated hardware and software.

The system of the present invention begins working when the user runs it from a portable device in which the system was previously installed.

Figure 1:
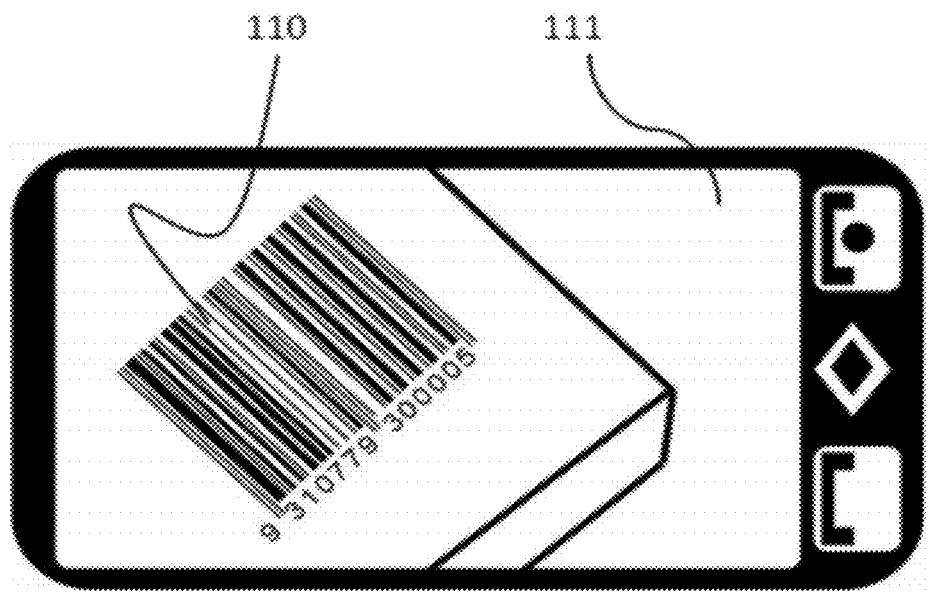
FIG. 1 shows how the user will interact with the invention.

FIG. 1 shows the system after initialization. After initialization, the digital camera device is triggered and the preview mode will start showing the frames filmed in the display device 111. At this moment, the frames are captured in real time at a rate of FPS frames per second, the value typical for FPS being 30.

When the barcode 110 is framed by the camera device, the system will start tracking and decoding operations that will process the pictures obtained by the camera under execution. At this time, it will be run the necessary procedures to find the guidance and boundaries of the barcode, and also made corrections related to lighting, signal/noise ratio, among others, and finally the barcode is decoded.

The present invention mainly aims turning a portable device equipped with a digital camera into a system for decoding barcodes, similar to the equipments found in shops and supermarkets. To that end, we developed methods to find the orientation and position of the barcode before it is decoded.

Figure 2:
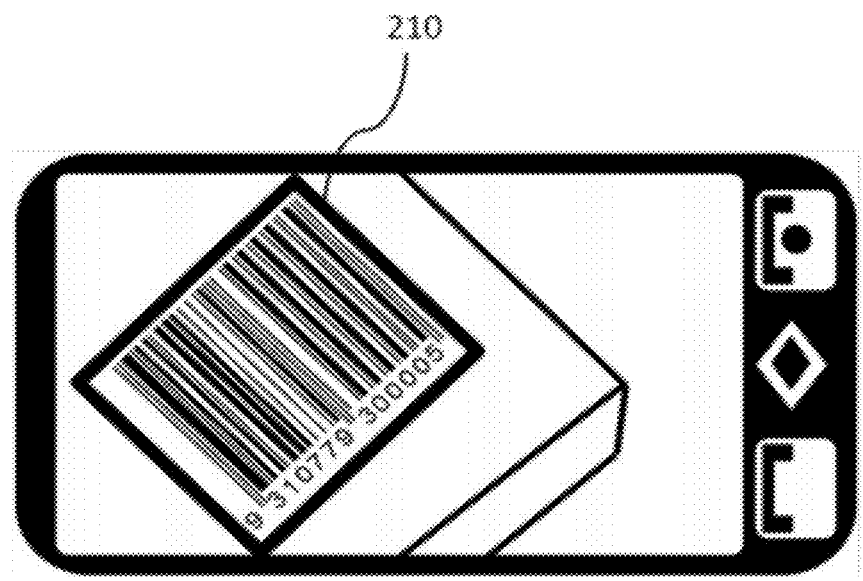
FIG. 2 shows how the invention presents to the user the information that the boundaries of the barcode were found.

FIG. 2 illustrates the moment when the barcode is found showing the rectangle 210 drawn around the boundaries of the barcode indicating that the location was performed successfully.

Figure 3:
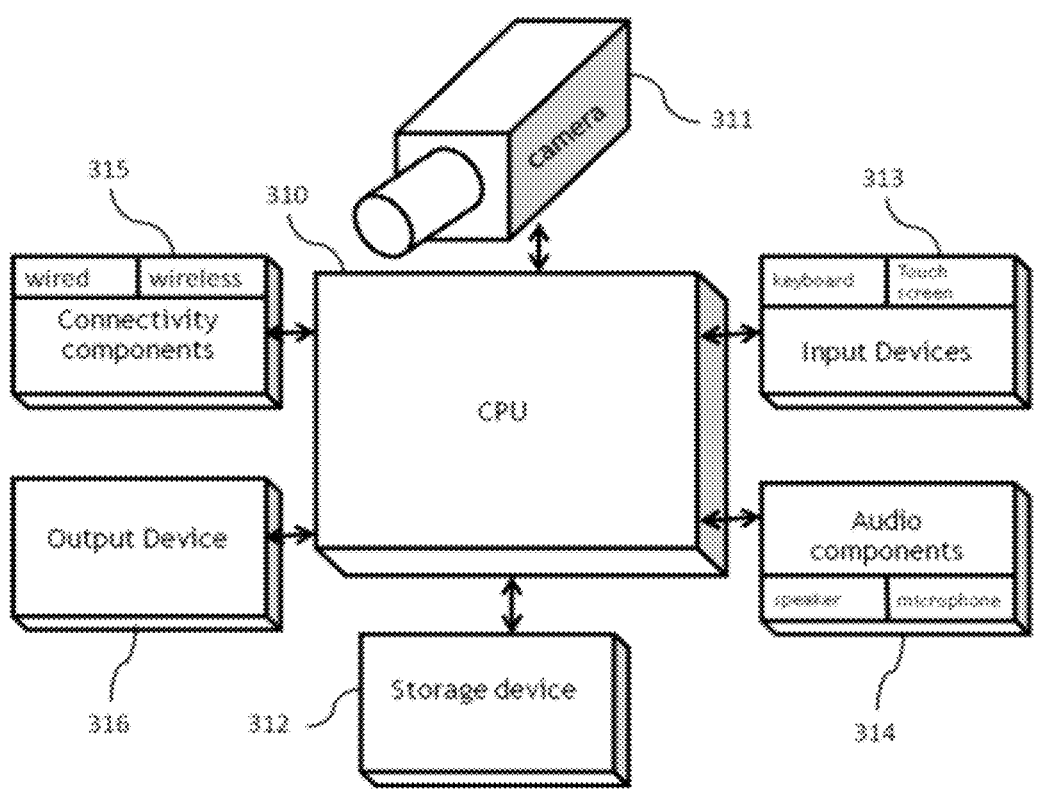
FIG. 3 shows a generic model of portable device, in which the system should work.

The hardware needed to make the system of the present invention work is a portable device, where its main features are illustrated in FIG. 3. The CPU 310 (Central Processing Unit) is responsible for executing the necessary instructions for managing the camera, and making calculations for processing the image with the barcode. The camera 311 or the reader captures the images and must have a sufficient focus so that the captured image maintains its clarity or having auto focus. The storage means 312 is intended to store information and data including the decrypted code, among others. The hardware also consists of information input devices 313 and audio components 314. Through some connectivity component 315, it is possible to make communication between the application and a remote database that has information about the products. The display means 316 is used to view the frames captured by the camera device.

Figure 4:
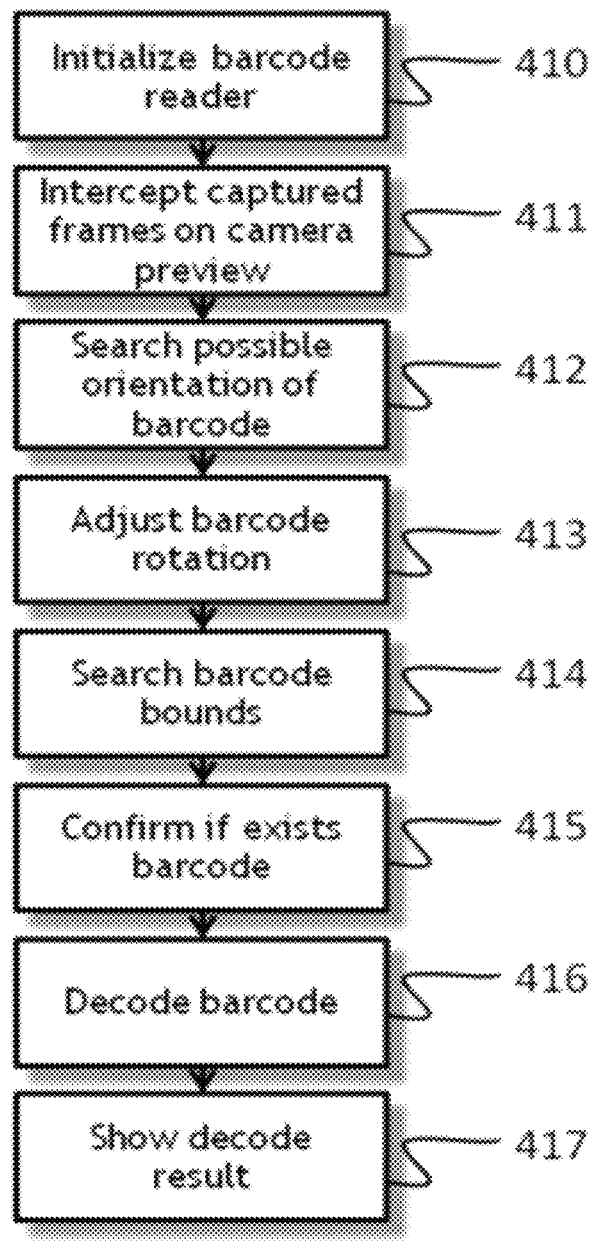
FIG. 4 is a block diagram showing the steps performed by the invention to perform the decoding of the barcode.

FIG. 4 shows the block diagram with the overall operation of the present invention. This diagram describes the process performed by the system, from obtaining the frame until locating and decoding barcode.

The step "initializing barcode reader" 410, comprises the driving and setting up of the digital camera integrated with the portable device, presentation of the user interface and preparation of the required parameters for the barcode reader is successfully executed. At this step, there is the definition of the resolution of the preview mode, in which it is typically selected the highest resolution supported by the equipment. In addition, it is activated the option focus macro for cameras that have auto-focus and support for this option. The focus macro is used to the auto-focus focuses images near the camera lens allowing images that are close to become clear. With this, it becomes possible to decode the smaller barcodes.

The step "intercepting captured frames in the preview mode of the mobile reader" (411), is responsible for obtaining the frames shot with efficiency and effectiveness. The portable device usually has an embedded operating system with the ability to perform multiple tasks simultaneously. Taking advantage of this feature, the process of reading the barcode is done in a separate thread from the thread in which the filmed frame is intercepted and displayed on the display device. With this, the camera continues filming and displaying the new frame while another frame is processed in another thread. To perform this procedure, well-defined methods have been developed to exchange information and messages between threads, as it will be described below.

Figure 5:
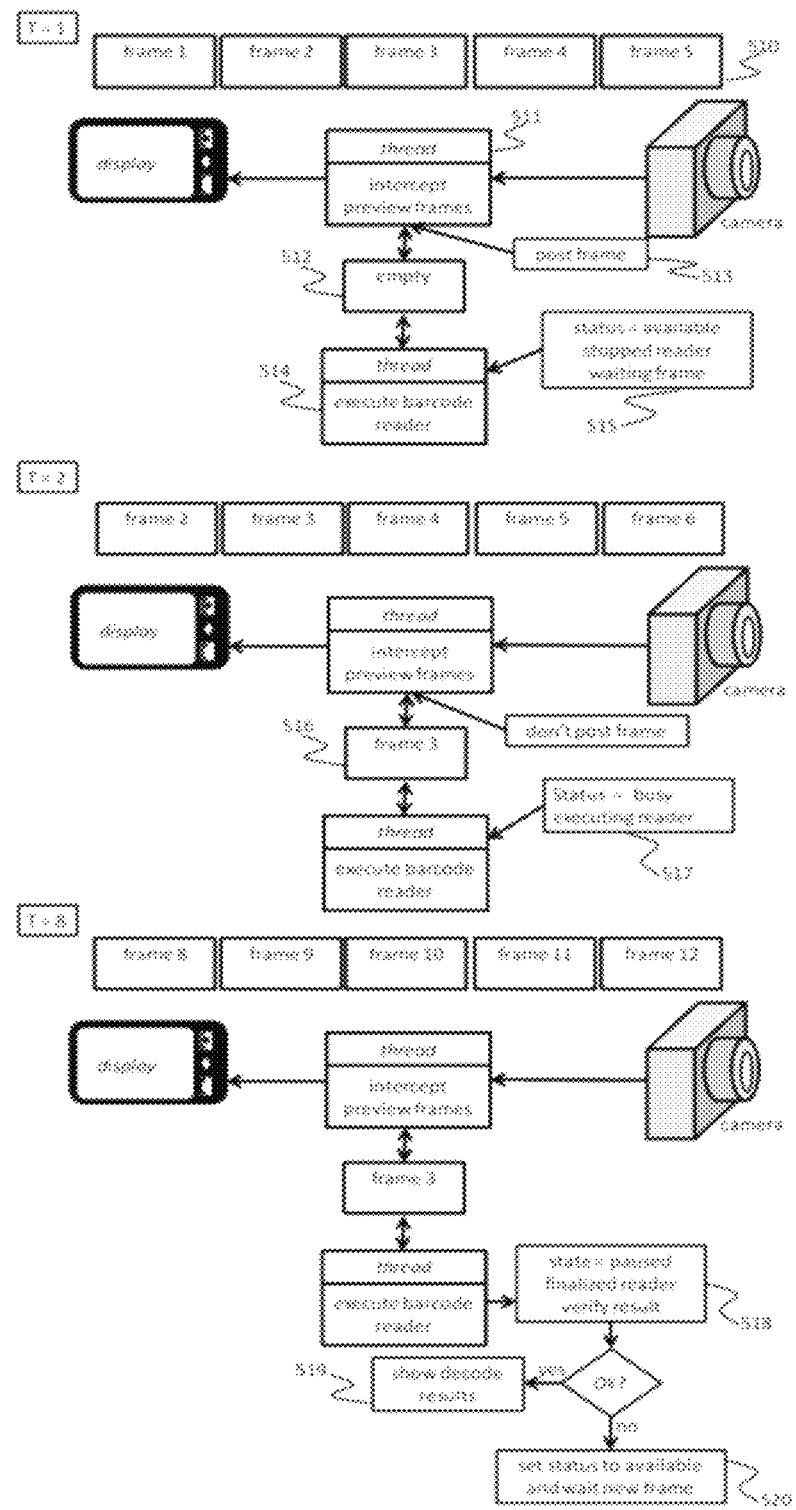
FIG. 5 shows the operation of the interception of the frames filmed by the camera of the portable device.

FIG. 5 shows the operation of the interception of the pictures filmed by the camera of the portable device. A thread 511 is responsible for capturing frames from the camera and exhibiting on the display. The filmed frame is intercepted and posted 513 to the other thread 514. At this time, the state of the reader is set to "available" 515. Then, the picture is copied to a shared memory area 512 and then reading of the barcode starts a new thread 514. At this time, the state is defined as "occupied" 517 and, thus, it is not possible to post a frame again.

Transactions carried out in the reading of the code use only the luminance image. Therefore, once the barcode reader receives the frame intercepted, it is checked the format of this frame and gets its luminance or gray scale, which represents the light intensity of image pixels. The camera integrated into the portable device can support multiple image formats with their respective color spaces. Many formats have already one channel for luminance, such as the YUV and YCbCr, which is stored in the luminance channel Y. A commonly used format is RGB, which equation for obtaining the luminance is:

$$L=0.299R+0.587G+0.114B \quad (1)$$

After reading, the state is defined as "paused" 518. If the reading was done successfully, then the result is displayed 519. Otherwise, the state is defined as "available" 520 and the process is restarted.

Using the procedure described above, it became possible to make reading the barcode without affecting the display of the frames shot, so that freezing does not occur at the time of image shooting, giving the user the sensation of fluidity in the displayed images, because it minimizes interference to the process of decoding the exhibition rate on the display of the portable device.

Figure 6:
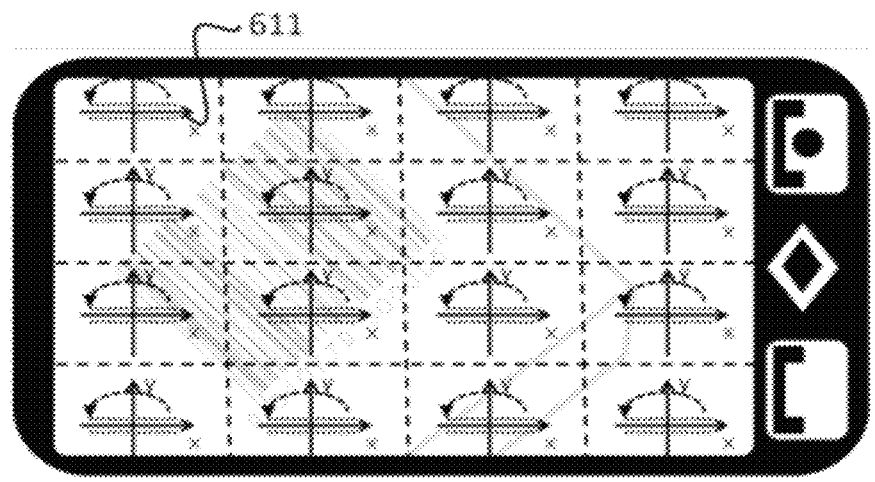
FIG. 6 shows the method used by the present invention to obtain the probable orientation of the barcode.

Returning to FIG. 4, the step "searching probable orientation of the barcode" 412 computes which is the rotation angle of the orientation, in which the barcode is. For this, the frame that contains the barcode is divided into smaller regions with the same size and each of these regions an angle is calculated. This operation is exemplified in FIG. 6. The equations used for the boundaries and size of the regions are shown below:

$$L_R = \frac{L_Q}{E_s} \quad (1)$$

$$A_R = \frac{A_Q}{E_s} \quad (2)$$

$$T_R = L_R * A_R \quad (3)$$

Equations (1) and (2) are used to calculate the width and height of each region, respectively. $L_Q$ is the width and height of the frame is $A_Q$. $E_S$ represents how many times a region will be smaller than the frame. Equation (3) calculates the total area of a region.

To estimate the angle of barcode, it is necessary to obtain the gray levels located in different orientations of scanning lines traversing the barcode. The pixels are obtained from the lines with slopes between 0° to 180°, with the center of the scan lines intersecting the center of the region, as exemplified in 611. For the track and scan of the lines, we used the 2D Bresenham algorithm, which computes the coordinates of the lines efficiently. The orientation of the barcode is the angle of the scan line between 0 and 180 that has lower variance in the grayscale pixels intercepted 712.

Figure 7:
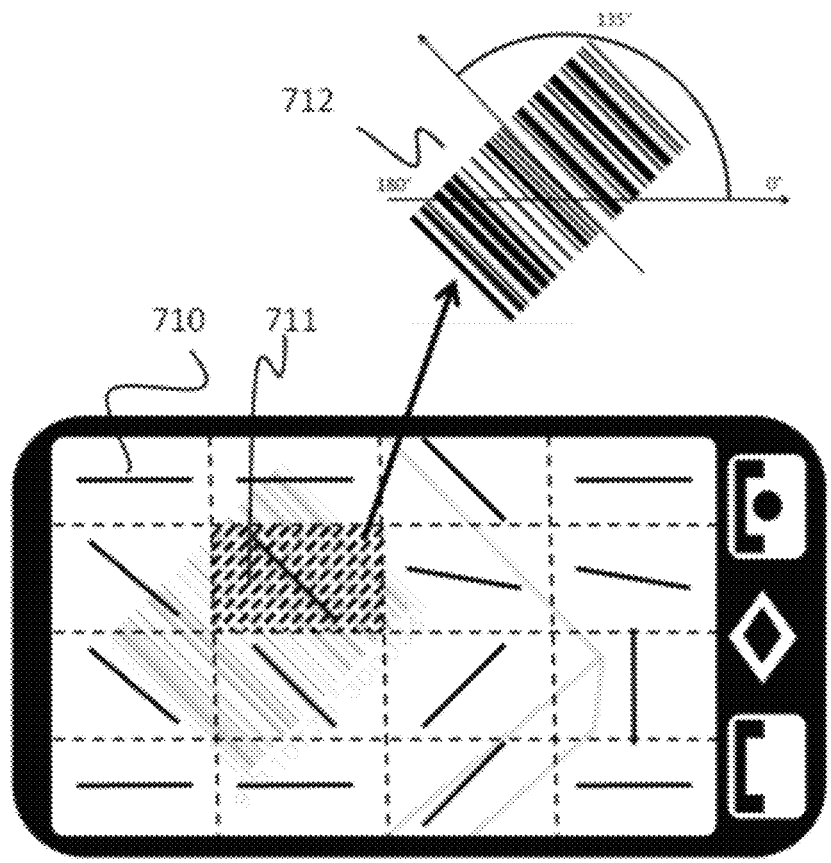
FIG. 7 presents the region with the probable orientation of the barcode.
Figure 8:
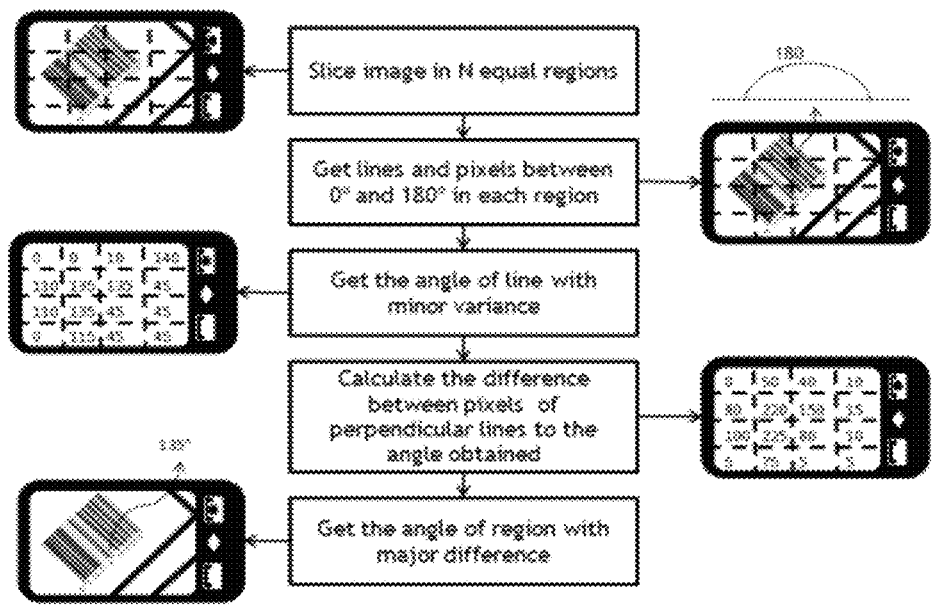
FIG. 8 details the operation of the method that computes the probable orientation of the barcode.

Each region will have a proper orientation 710, obtained as detailed above. However, it is necessary to obtain the orientation belonging to the barcode. For this, we calculate the level of variation of gray levels from a line perpendicular to the orientation computed in each region. With this, we have the guidance of the barcode corresponding to the orientation computed for the region with the greatest variation between the levels of gray. FIG. 7 shows how it would be the result of this operation and FIG. 8 illustrates in details the obtainment of the estimated orientation of the barcode. This process is calculated from the following equations:

$$\Delta x = a + r\cos(\theta) \quad (4)$$
$$\Delta y = b + r\,sen(\theta)$$
$$x_0 = r - \Delta x$$
$$y_0 = r - \Delta y$$
$$x_1 = r + \Delta x$$
$$y_1 = r + \Delta y$$
$$B(a, b, r, \theta) = bresenham\ 2d(x_0, y_0, x_1, y_1)$$

$$\bar{x} = \frac{1}{N}\sum_{i=1}^{N} x_i \quad (5)$$

$$v = \frac{1}{N-1}\sum_{i=1}^{N}(x_i - \bar{x})^2 \quad (6)$$

$$\operatorname*{argmin}_{\theta \in \{1°, 5°, \ldots 175°, 180°\}} [v(B(a, b, r, \theta))] \quad (7)$$

Equation (4) illustrates the process used to calculate the coordinates of the line that will be analyzed by the algorithm. The function B (a, b, r, θ) extract lines with different slopes, with parameters a and b representing the coordinates of the center line. In this method, a and b are the coordinates of the center of the region in relation to the frame containing the barcode. The parameter r is the radius used to define the size of the line that will be equal to 2r. The parameter θ is the angle of the line. Bresenham 2d function, as mentioned earlier, is to quickly compute the positions of the points of a line, thus obtaining the gray levels in line with their respective coordinates along a scan line. This function takes as parameters the coordinates of the beginning and end of a line. Equation (5) computes the average, used in equation (6) to calculate the variance. The variable x is a vector of luminance values along the line calculated with equation (4) and $x_i$ is the pixel luminance value corresponding to the position i. Finally, we show the equation (7) which the result will be the angle of the line with the smallest variance. The obtained lines having a slope varying between 1° and 180°, with each iteration this angle is increased delta degrees (typical value: 5).

At this time, several small regions are obtained with their respective angles. So, the next step is to discover what is the region where the barcode is and obtaining the resulting angle. Taking advantage of the structure of the barcode is formed by white and black, it is searched the region with the greatest variation among gray levels in the direction perpendicular to the resulting angle.

$$d = \frac{1}{N-1} \sum_{i=1}^{N-1} (x_i - x_{(i+1)}) \tag{8}$$

$$\underset{j \in \{1,2,\ldots J\}}{\operatorname{argmax}} [d(B(a, b, r, \theta_j + 90°)] \tag{9}$$

Equation (8) calculates the level of variation of a line, where x is a vector corresponding to a scan line with their respective levels of gray. Equation (9) returns an estimate of the angle of barcode, which will be the angle obtained by equation (7), the region with the largest variation between the gray levels of lines perpendicular to this angle. In equation (9) θj is the angle of the region j, and J is the total number of regions. From the resulting angle, it becomes possible to correct the rotation of the barcode.

Figure 9:
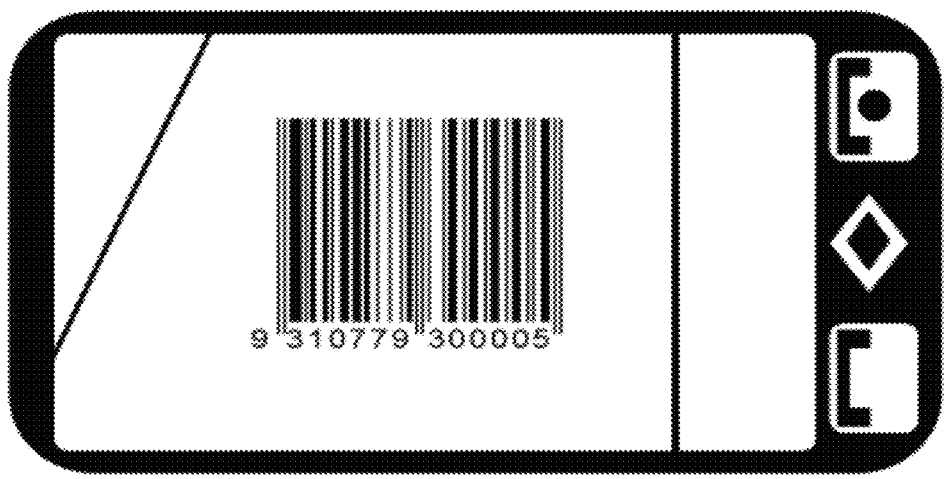
FIG. 9 displays the barcode after its rotation corrected.

Returning to FIG. 4, step "correcting rotation of the barcode" 413 is used to decode barcode too tilted. This step is performed only if the rotation angle of the barcode is less than 80° and greater than 100°, since it is possible to read the barcode with a small slope. The result of correction of the barcode is illustrated in FIG. 9. To correct the barcode once again, we use Bresenham 2d that will sweep all lines perpendicular to the orientation of the barcode and, in turn, will create a new image stacking these lines.

Figure 10:
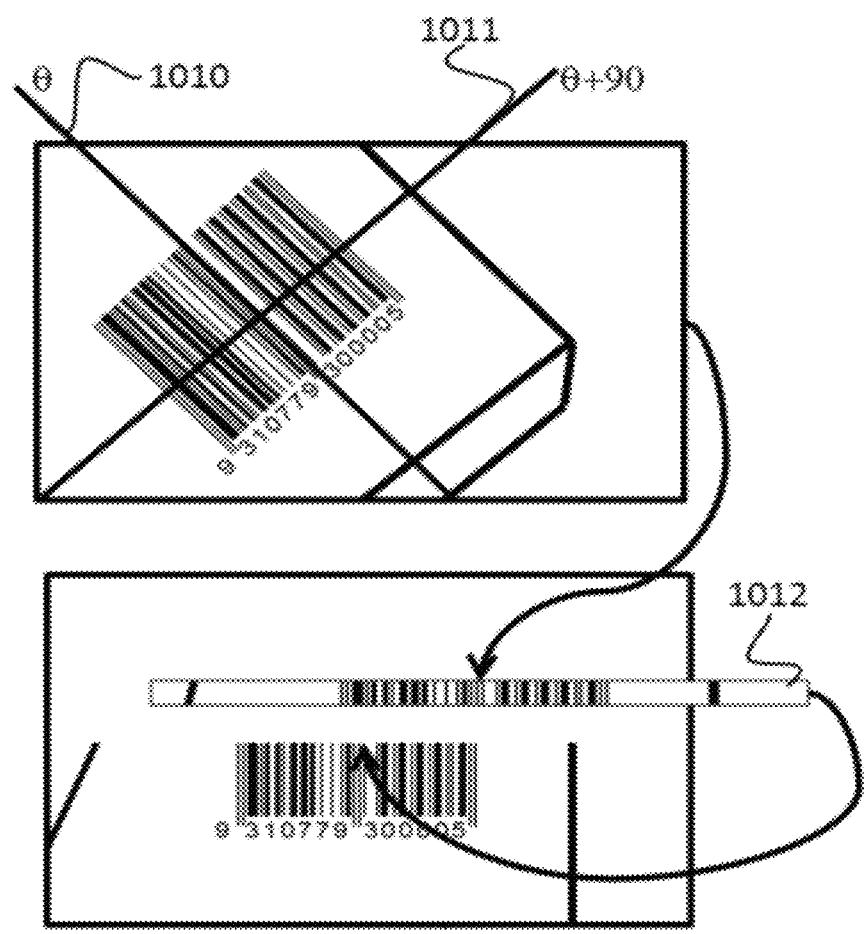
FIG. 10 illustrates the process of correcting the rotation of the barcode.

FIG. 10 illustrates the process of correcting the rotation of the barcode, where, after obtaining the rotation angle of the barcode 1010, we compute all lines perpendicular to this angle 1011 and, as mentioned before, a new image is created, vertically stacking each line perpendicular to bars 1012 of the barcode.

After correction of rotation of the barcode, it follows to step "searching the boundaries of the barcode" 414 that finds the location of the barcode. This step calculates the position which starts the barcode and the position where it ends, both horizontally and vertically.

Figure 11:
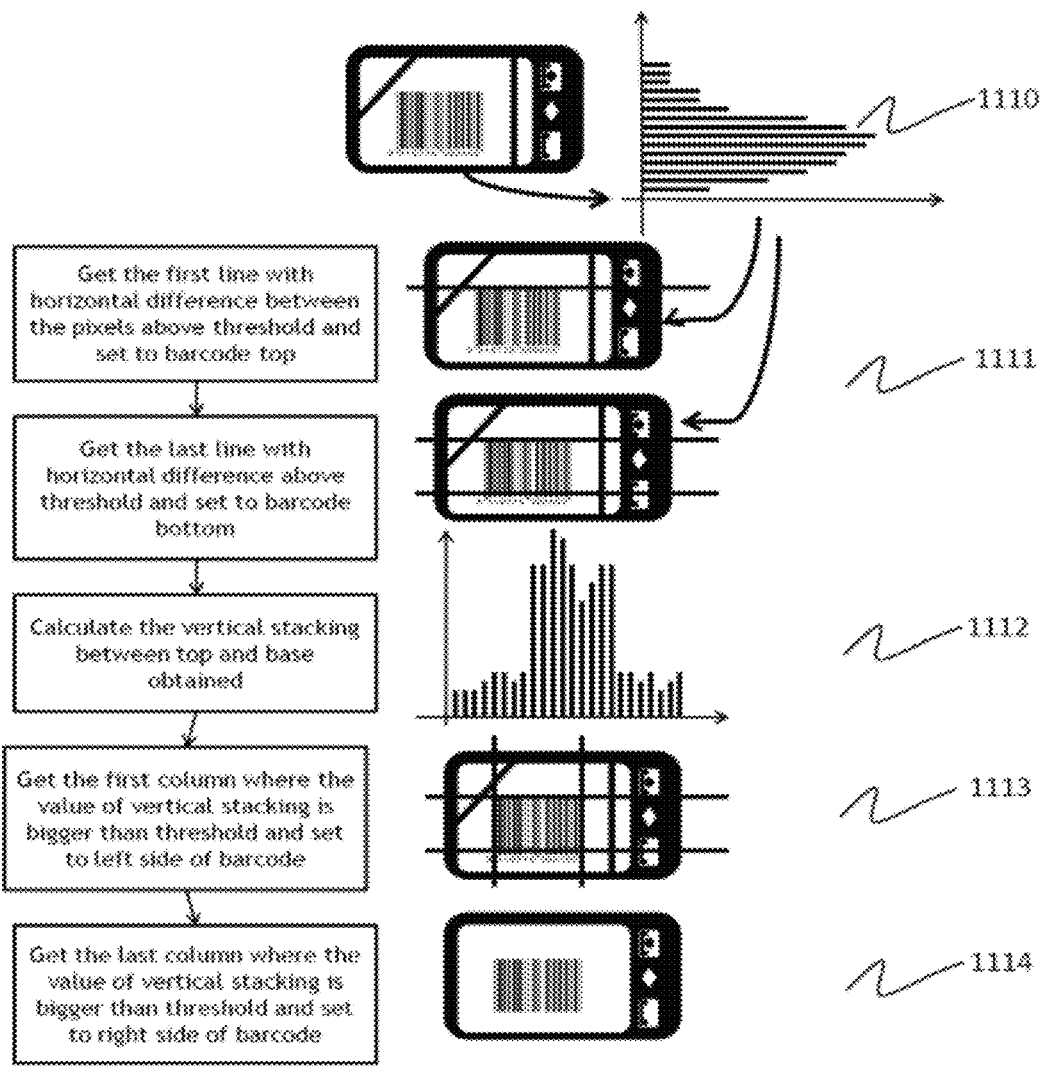
FIG. 11 details the operation of the method that finds the boundaries of the barcode.

FIG. 11 shows the process performed to obtain these data. The first phase of this process is trying to find the top and bottom of the barcode. For this, it calculates the difference of each horizontal image line 1110. With this, it is possible to obtain the top of the barcode which will be the first line with a variation between the gray levels which is greater than the established threshold and the base of the barcode is the last line greater than this threshold. The following equations describe this process:

$$C = \frac{1}{L-1} \sum_{j=1}^{L-1} (x_j - x_{(j+1)}) \tag{10}$$

$$D_i = C_i, \text{ where } i = 1, 2, \ldots A$$

$$\begin{cases} D_i > T_1, t = i, & \text{where } i = 1, 2, 3, \ldots A \\ D_i > T_1, b = i, & \text{where } i = A, A-1, -A-2, \ldots 1 \end{cases} \tag{11}$$

Equation (10) and equation (11) describe the process used to find the top and bottom of the barcode. Equation (10) corresponds to the algorithm that calculates the variation of gray levels of each image line. The C function calculates the level of variation of each line, where L is the width of the image and $x_j$ is the value corresponding to column j. Its return is the average variation of the gray level of an image line. D is a vector that stores the value of the level of variation of each image line, where $D_i$ represents an element of this vector at position i. The variable A is the height of the image and will be the size of the vector D. Equation (11) represents the algorithm that searches the top and bottom of the barcode from the result of equation (10), the top t is the first line with a range greater than the threshold, T1, and the base b will be the last line with a range greater than this threshold.

After finding the top and bottom of the barcode, the next step is the search for the left and the right side of the barcode. For this purpose, it is done for the vertical stacking of the region between the top and bottom 1112. As the barcode is formed by black vertical lines, so this will be found between the stacking of elements whose values are greater than the threshold. Then, the left side of the barcode will be the first column and the right side will be the last column with values greater than the threshold 1113. The following equations show how the search is done by the left and the right side of the barcode:

$$F = \frac{1}{b-t} \sum_{i=t}^{b} y_i \tag{12}$$

$$E_j = F_j, \text{ where } j = 1, 2, \ldots L$$

$$\begin{cases} E_j > T_2, l = j, & \text{where } j = 1, 2, 3, \ldots L \\ E_j > T_2, r = j, & \text{where } j = L, L-1, L-2, \ldots 1 \end{cases} \tag{13}$$

Equation (12) computes the vertical stacking of the columns between the position t e b, calculated in equations (10) and (11). The variable y corresponds to a column of the image, where $y_i$ is the element of column in the row i. The variable E is a vector with the values of vertical stacking, where $E_j$ is its element at position j. L is the width of the image and corresponds to the total of elements of E. Equation (13) searches the left and right side of the barcode, where T2 is the threshold of the stack, so the barcode is located in the region where the stack has a value greater than T2.

At the end of the process of finding the barcode, the coordinates will be obtained with the boundaries of the barcode, and thus the reader will consider only the rectangular region bounded by these coordinates 1114, making it not be computed elements that do not are present in the barcode and, in turn, could make it difficult to read this.

Figure 12:
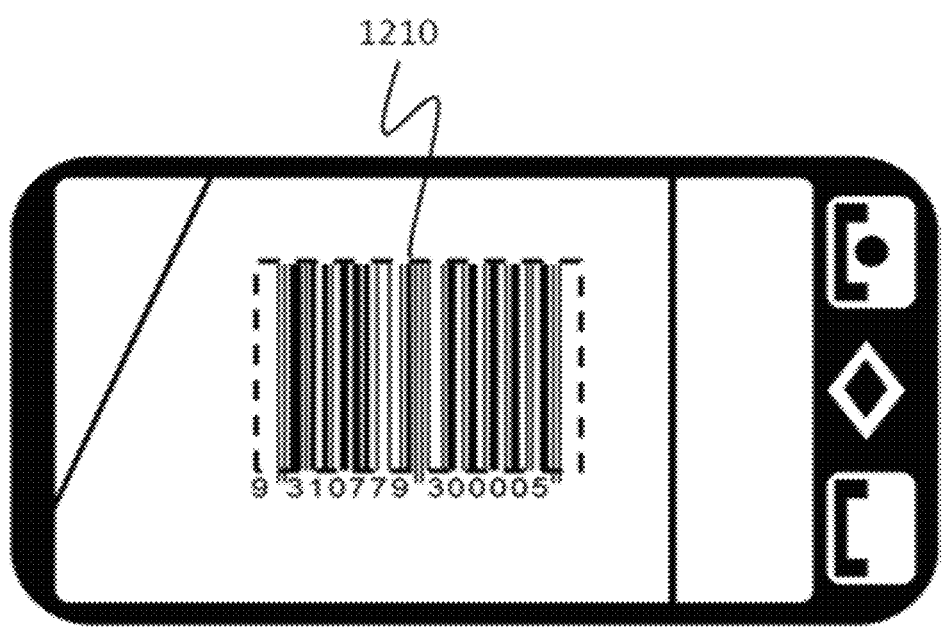
FIG. 12 represents the time in which the invention computes the boundaries of the barcode.

FIG. 12 illustrates the result of search by the boundaries of the barcode, exemplifying how it would be the region selected 1210.

The step "confirming the presence of the barcode" 415 analyzes if inside the selected region there is a barcode indeed. This is done by checking the level of abrupt variation of shades of gray within the boundaries computed for the barcode. This process runs as follows: a horizontal line is selected in the middle of the region corresponding to the barcode. If the level of variation of gray tones of this line is less than the threshold, then the image analysis is ignored and the process is restarted, otherwise, the next step is executed, as it was confirmed the presence of a barcode.

Figure 13:
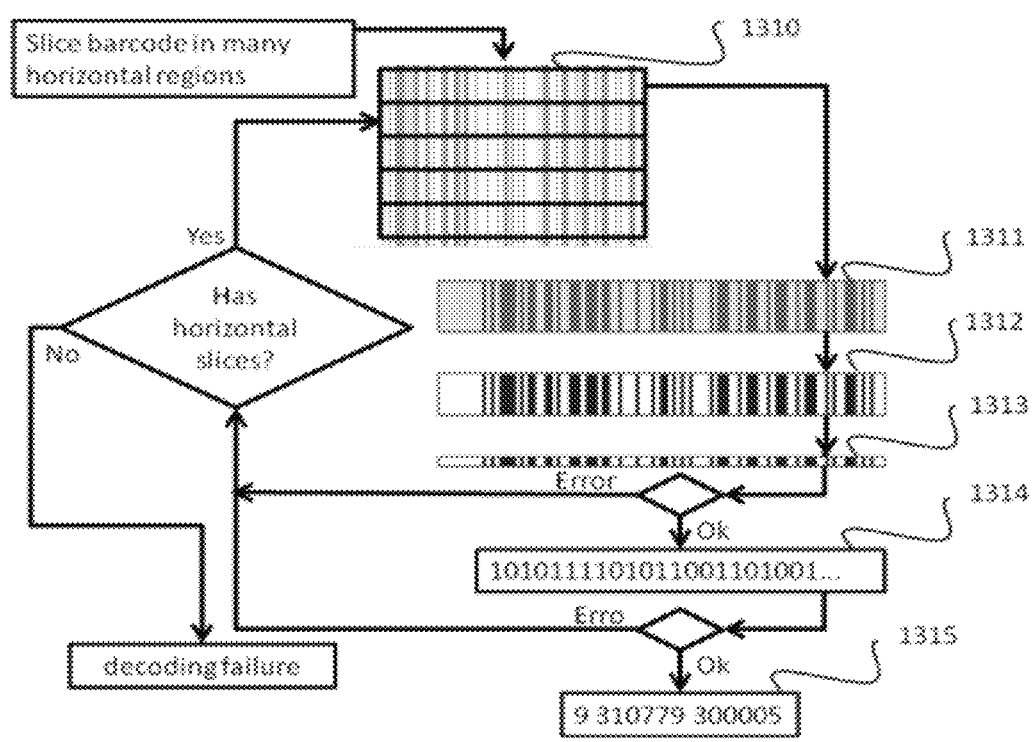
FIG. 13 shows the decoding flow of the barcode.

If confirmed the presence of the barcode within the boundaries calculated, then the step "decoding barcode" 416 runs. This step corresponds to the core of the decoding and is used for reading the barcode, as illustrated in FIG. 13. The step "decoding barcode" 416 is divided into sub-steps (FIG. 13). Each of these steps apply a particular action to the image of the barcode, and the result of a previous sub-step is used as an input parameter to the next step. These sub-steps are described in detail below:

Horizontal slicing of the barcode (1310): The image is sliced horizontally and each of these slices is processed individually, where, if the present slice 1311 succeeds in decoding, the process is completed and the result of decoding is returned. The amount of horizontal slices is one of the parameters used by the barcode reader system, and this number can be changed depending on the flow of execution of the algorithm, i.e., the slicing is adaptive; first it tries to make decoding from an initial parameter. If the reading does not occur with this parameter, this will be increased until a successful decoding or until you reach the maximum horizontal slices.

Binarization of the horizontal slice (1312): This sub-step is responsible for converting the image values, which are generally found with 255 different gray levels in only two distinct tones: black and white. This step represents one of the steps necessary for successful decoding, it is from this that you can set the bar that is black and the bar that is white.

Figure 14:
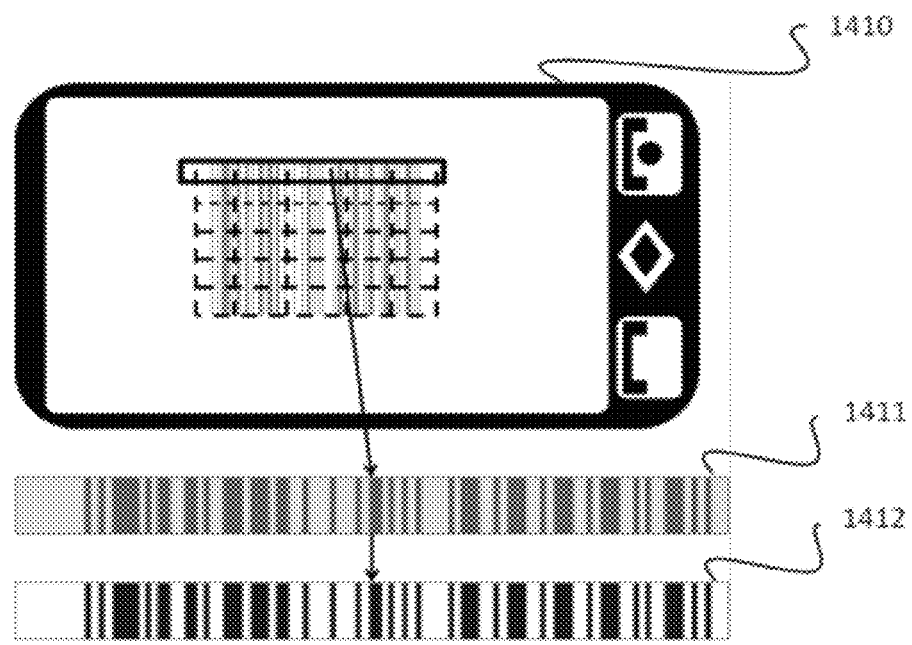
FIG. 14 represents the time in which the invention distinguishes components from black and white in the barcode.

FIG. 14 represents the time in which the invention distinguishes components from black and white barcode. To perform the binarization slice, you must set the threshold that separates whites from blacks. To do this, the horizontal slice and vertical slices are divided and the threshold tone is calculated for the vertical slice. This threshold is obtained by averaging the gray scale of each vertical slice. If the value of the pixel tone is less than this threshold, then black is considered, otherwise it is attributed to white. However, to the threshold are applied sets of weights in order to correct the distortion caused by lighting, which in the case of many dark environments, the threshold value is reduced, and for environments with high lighting it will be raised. The equations below detail this process:

$$M = \frac{A}{NH} \tag{14}$$
$$N = \frac{L}{NV}$$
$$l = M * h$$
$$c = N * v$$

$$S = W * \frac{1}{MN} \sum_{i=l}^{M+l} \sum_{j=c}^{N+c} G_{ij} \tag{15}$$

$$\begin{cases} G_{ij} >= S_{hv}, B_{wj} = 255 \\ G_{ij} < S_{hv}, B_{wj} = 0 \end{cases}, \tag{16}$$

where
$i = l, l+1, l+2, \ldots l+M,$
$j = c, c+1, c+2, \ldots c+Ne$
$w = 1, 2, \ldots M.$ Equation (14) calculates the sizes and initial coordinates of the horizontal and vertical slices. M is the height of the horizontal slice, and N is the width of the vertical slice, variable A is the height and the variable L corresponds to the width of the image. The variable NH represents the number of horizontal slices and the variable NV represents the number of vertical slices. Variables h and v are also used and are, respectively, the current indices of the horizontal slice and vertical slice. The line number of the initial slice is represented by I and the number of the column is represented by c. The function S computes the threshold used to distinguish black from white, where W is the weight that makes it suitable the threshold for the level of environment lighting. Equation (16) digitalizes the horizontal slice. The variable G represents the grayscale image, where i is the position of a line and j the position of a column. The variable B is a horizontal slice binarized.

Vertical stacking of the binarized slice (1313): in this sub-step, two-dimensional slice is converted to a one-dimensional vector. This process is done through the vertical stacking of the binarized slice. This process takes the average grayscale of each column. If this average is greater than 127, then, the value is set to white, otherwise, it is black. The cutoff value is 127, because the binarized image has only the values 0 to 255 for black and white.

$$P = \frac{1}{M} \sum_{i=0}^{M} B_{ij} \tag{17}$$

$$\begin{cases} P_j > 127, R_j = 255 \\ P_j <= 127, R_j = 0 \end{cases}, \tag{18}$$

where
$j = 1, 2, \ldots N$

Equation (17) makes the vertical stacking of the binarized slice. Equation (18) converts the values of two-dimensional array in one-dimensional array, where R is the one-dimensional array in which $R_j$ represents its element at position j.

Figure 15:
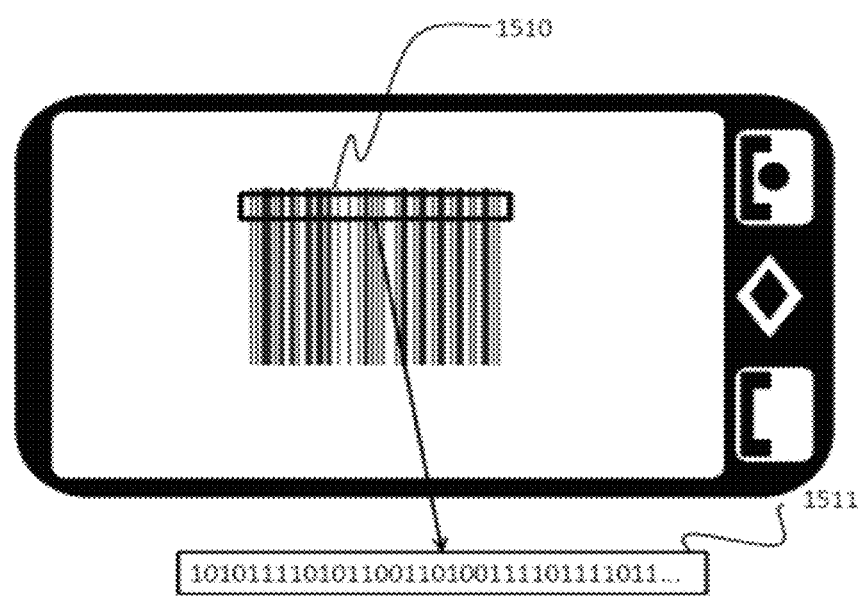
FIG. 15 represents the moment in which the invention sets the bar of the barcode.

Converting pixels into bars (1314): This sub-step takes as input the vector returned by the previous step that has the information of the bars in pixels, converting it to a vector representation of the barcode EAN-13. This code has four levels of bars (thin, average: two thin bars, large: three thin bars, very wide: four thin bars). So, it is necessary to find a way to define how many pixels each bar has. In the picture, the atomic element is the pixel. In the barcode EAN-13, the atomic element is a thin bar. So, it is necessary to try to find the size in pixels of the bar fine, and from this, it is defined the size of the other bars. The first step in making this conversion is to find the start and end bars of the code, and after that the positions of the bars corresponding to the digits are searched. It is known that each digit has four bars of different sizes, but these digits are always formed by 7 thin bars. Therefore, knowing the size in pixels the width of the thin bar, it becomes possible to calculate the width of the other bars. So to each digit, it is possible to obtain the width of the thin bar, and in turn calculates the width of the other bars that form the digit. Thus, it becomes possible to obtain the correct size of the bars of the barcode packaging with rounded surface. FIG. 15 illustrates this conversion, where the number represents a thin black bar and number 0 represents the thin white bar.

Translation of the barcode (1315): This sub-step performs the translation of the barcode, that is, from the combination of four bars, it is possible to obtain the digit coded by the same. Barcode EAN-13 has 13 digits, with 12 of these are encoded in a bar and is encoded by the parity of the first 6 digits. After translation of the barcode, it is calculated the check digit. Soon after, the check digit is checked, and if successful, the value of the barcode decoded is returned.

Returning to FIG. 4, the step "showing the result of decoding" 417 presents the result of reading the barcode only in cases, in which the decoding was successful. At this step, according to the preferred embodiment of the present invention, with the result of the barcode, it is made a research on the outlets that provide the product identified by the decoded barcode, and the price of this.

Figure 16:
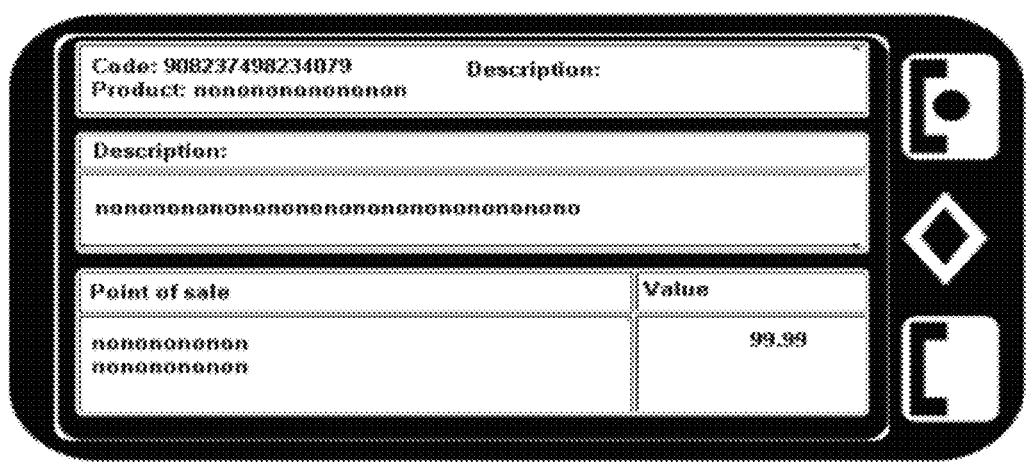
FIG. 16 illustrates the screen with the result of decoding.

FIG. 16 illustrates the screen with the result of decoding, according to the preferred embodiment of the invention.

Although a preferred embodiment of the present invention is shown and described, those skilled in the technical field will understand that various modifications can be made without departing from the spirit and scope of the present invention, as defined in the appended claims.

It is also expressly stated that all combinations of elements that perform the same function in substantially the same way to achieve the same results are within the scope of the present invention.

The invention claimed is:

1. An automatic method for tracking and decoding a barcode using a barcode reader on a mobile device, the method comprising:
    initializing the barcode reader;
    capturing, using the mobile device, the barcode in an image frame;
    intercepting the captured image frame in a preview mode of the mobile device;
    determining a probable orientation of the barcode;
    correcting a rotation of the barcode;
    searching for the boundaries of the barcode;
    confirming the presence of the barcode;
    decoding the barcode; and
    displaying, on a screen of the mobile device, the result of the decoding,
    wherein the decoding the barcode comprises slicing the barcode horizontally and processing each of the slices individually, and
    wherein, if a slice being processed is successfully decoded, the decoding is completed and the barcode is translated.

2. The method of claim 1, wherein initializing the barcode reader comprises:
    driving and setting up the barcode reader integrated with the mobile device,
    presenting a user interface; and
    preparing the required parameters for running the barcode reader.

3. The method of claim 2, wherein a best resolution of the preview mode supported by the mobile device is selected.

4. The method of claim 1, wherein a macro function of the mobile device is used with an auto focus to focus images close to the barcode reader, allowing images that are close to be clearer and improve the decoding of smaller barcodes.

5. The method of claim 1, wherein during the intercepting the captured frames in the preview mode of the mobile device, the barcode reader continues the image capture and displays the new frame while another frame is processed in another thread.

6. The method of claim 1, wherein the method is performed using only a luminance image.

7. The method of claim 1, wherein the determining the probable orientation of the barcode comprises computing the angle rotation of the direction in which the barcode is, dividing the frame that contains the barcode into smaller regions with equal size, and computing an angle for each of these regions.

8. The method of claim 1, wherein, to estimate the angle of barcode, the gray levels located in different orientations of scanning lines are obtained by traversing the barcode, and the pixels obtained from the lines with slopes between 0° to 180°, with the center of the scan lines intersecting the center of the region.

9. The method of claim 1, wherein the orientation of the barcode is the angle of the scan line between 0° and 180° that has the lower variance in the tones of intercepted gray pixels.

10. The method of claim 1, wherein the orientation belonging to the barcode is obtained by calculating the level of variation in gray levels of the line perpendicular to the orientation computed in each region, and the orientation of the barcode corresponds to the orientation computed for the region with the greatest variation between the levels of gray.

11. The method of claim 1, wherein the correcting the rotation of the barcode is used to decode a barcode that is too tilted, being performed only if the rotation angle of the barcode is less than 80° and greater than 100°.

12. The method of claim 1, wherein the correcting the rotation of the barcode scans all lines perpendicular to the orientation of the barcode, creating a new image stacking these lines.

13. The method of claim 1, wherein finding the top and bottom of the barcode, comprises calculating the horizontal difference of each image line, the top of the barcode being the first line with a variation between the gray levels greater than the threshold and the base of the barcode is the last line greater than this threshold, finding the left and the right side of the barcode comprises the vertical stacking of the region between the top and bottom, and the left side of the barcode to the first column and the right side, the last column with values greater than the established threshold, the coordinates were obtained with the boundaries of the barcode delimited by the coordinates, so that the elements that are not present in the barcode are not computed.

14. The method of claim 1, wherein the confirming the presence of the barcode analyzes whether within the selected region actually there is a barcode, checking the level of abrupt variation of shades of gray within the boundaries computed for the barcode, being selected a horizontal line in the middle of the region corresponding to the barcode and if the level of variation in tone gray of the line is less than the threshold, then the image under analysis is ignored and the process is restarted, otherwise the next operation is executed, as it was confirmed the presence of a barcode.

15. The method of claim 1, wherein the displaying the result of decoding presents the result of bar code reading only in cases in which the decoding was successful.

16. The method of claim 1, wherein the barcode is used to complete a survey on the points of sales providing the product identified by the decoded barcode and the price of this product.

17. The method of claim 1, wherein the searching for the boundaries of the barcode calculates the position in which the barcode begins and the position in which the barcode ends, both horizontally and vertically.

18. An automatic method for tracking and decoding a barcode using a barcode reader on a mobile device, the method comprising:

initializing the barcode reader;

capturing, using the mobile device, the barcode in an image frame;

intercepting the captured image frame in a preview mode of the mobile device;

determining a probable orientation of the barcode;

correcting a rotation of the barcode;

searching for the boundaries of the barcode;

confirming the presence of the barcode;

decoding the barcode; and displaying, on a screen of the mobile device, the result of the decoding, wherein the decoding the barcode used for reading the barcode comprises the following:

horizontal slicing the barcode, in which the image is sliced horizontally and each of these slices is processed individually, where, if the present slice succeeds in decoding, the process is completed and the result of decoding is returned;

binarization of the horizontal slice which is responsible for converting the image values, which are generally found with 255 different gray levels in only two distinct tones: black and white, being the threshold that separates whites from blacks defined from the division of the horizontal slice and vertical slices and calculating the threshold tone for the vertical slice which is obtained by averaging the gray scale of each vertical slice, and if the value of the pixel tone is less than this threshold, then black is attributed, otherwise white is attributed;

vertical stacking of the binarized slice, in which the two-dimensional slice is converted to a one-dimensional vector, through the vertical stacking of the binarized slice, which takes the average grayscale of each column and the average is greater than 127, then, the value is set to white but is black;

converting pixels for bars using, as input, the vector returned by the vertical stacking that has the information of the bars in pixels, and converting it to a vector representation of the barcode; and translating the barcode.

\* \* \* \* \*

UNITED STATES PATENT AND TRADEMARK OFFICE
CERTIFICATE OF CORRECTION

PATENT NO. : 9,224,026 B2
APPLICATION NO. : 12/981616
DATED : December 29, 2015
INVENTOR(S) : Gustavo De Almeida Neves et al.

Page 1 of 1

It is certified that error appears in the above-identified patent and that said Letters Patent is hereby corrected as shown below:

In the Claims:

Column 16, Lines 18-19, Claim 8, delete "180° ," and insert --180°,--, therefor.

Signed and Sealed this
Twenty-sixth Day of April, 2016

Michelle K. Lee
*Director of the United States Patent and Trademark Office*